United States Patent [19]
Ewald et al.

[11] Patent Number: 5,091,688
[45] Date of Patent: Feb. 25, 1992

[54] REMOTELY SWITCHED VOLTAGE CONVERTER

[75] Inventors: Dennis G. Ewald, 15950 E. Big Mound Rd., Lindenwood, Ill. 61049; William F. McKenna, Loves Park, Ill.

[73] Assignee: Dennis G. Ewald, Lindenwood, Ill.

[21] Appl. No.: 654,048

[22] Filed: Feb. 12, 1991

[51] Int. Cl.⁵ .......................... H02P 9/06; H02M 7/64
[52] U.S. Cl. ......................................... 322/8; 363/175
[58] Field of Search ................. 322/7, 8; 219/133; 363/175

[56] References Cited

U.S. PATENT DOCUMENTS

| | | | |
|---|---|---|---|
| 3,665,502 | 5/1972 | Means | 307/77 X |
| 3,953,782 | 4/1976 | Means | 307/10 R X |
| 4,019,119 | 4/1977 | Naber | 322/8 |
| 4,862,058 | 8/1989 | Engleman | 322/8 X |

Primary Examiner—R. J. Hickey
Attorney, Agent, or Firm—Stanley E. Anderson, Jr.

[57] ABSTRACT

A motor-driven alternator including an improved remote on/off switch closure detection system capable of detecting closure of solid-state switches. Such switches are typical of appliances, tools, or other electrical load devices. A sensing signal is provided by a higher voltage ac or pulsating dc signal for overcoming the forward breakdown voltage of semi-conductors typical of such switches. A detection circuit is included which comprises an opto-isolator circuit for isolation of the power and sensing circuits.

20 Claims, 2 Drawing Sheets

1

REMOTELY SWITCHED VOLTAGE CONVERTER

FIELD OF THE INVENTION

The present invention relates to the dc/ac voltage converter field, and more particularly to battery-operated motor-driven alternator sets for powering ac electrical devices in which the motor-driven alternator set is remotely turned on and off by the on/off power switch of the electrical device. The present invention includes a control and sensor circuit which remotely senses an attempt to energize the electrical device by turning on its power switch, and in response thereto applies battery power to the motor. More specifically, the present invention is directed to remote actuation of the motor-driven alternator with the solid-state on/off power switch common in conventional electrical devices, such as tools, (e.g., power drills, screwdrivers, etc.) appliances, and the like.

DESCRIPTION OF THE PRIOR ART

Voltage converters for ac power operated tools, appliances, or other electrical devices are well-known in the art. A motor-generator set, comprising a dc motor and an alternator, was simply connected to a battery to power the dc motor, which in turn mechanically drove the alternator to provide ac power for the tool or appliance. It was inconvenient to switch the motor-driven alternator on and off when it was remotely located, but the battery would become discharged if the motor-generator set was left on when the tool or appliance was not in use.

In one prior art solution to that problem, a simple on-off control switch connected in an extra set of conductors in the power cord enabled the motor-driven alternator to be switched on and off from the remotely located tool or work site. However, this arrangement required special cables which were expensive to fabricate. In another prior art device, a dc current derived from the battery was applied via the normal power cable to the tool. When the appliance or tool switch was closed, the dc current would close a relay which energized the motor-driven alternator until the appliance or tool switch was opened, whereupon the motor would be disconnected from the battery source. An example of such a voltage converter is illustrated in U.S. Pat. No. 4,019,119 to Naber.

With the advent of solid-state switched power tools, which typically include a variable speed function, the appliance or tool cannot switch the motor-driven alternator power on and off. The solid-state control switches of these power tools present a high impedance load until the source voltage reaches a relatively high level, often above 50 volts or higher. Since the battery power source is conventionally only about 13 volts, the appliance or tool switch does not present a low enough impedance load to the relay circuit to close the relay and power the motor driving the alternator. Multiple conductor cables having an extra circuit including remote on/off switches have been the primary way to operate these solid-state switched appliances and tools. Modern safety standards necessitate operation of such appliances and tools through ground fault interruption devices, to prevent electrocution accidents.

In view of the foregoing limitations and short-comings of the prior art devices, as well as other disadvantages not specifically mentioned above, it should be apparent that there still exists a need in the art for a voltage converter capable of being switched on remotely from a load device having a solid-state control switch. It is, therefore, a primary object of this invention to fulfill that need by providing a voltage converter capable of remote activation of the motor-driven alternator through closure of the on/off switch of solid-state appliances and tools, especially those requiring a relatively high trigger voltage.

SUMMARY OF THE INVENTION

The present invention overcomes the aforesaid obstacles by a control circuit including an ac oscillator for supplying an ac (or pulsating dc) voltage to the tool which is of a level sufficient to overcome the initial trigger control voltage requirement of these appliances and tools, generally well above the typical battery voltage of about 13 volts. A special bridge circuit is used to detect current flow in this control circuit, which is used to control a relay connecting the motor-alternator set to the battery. An opto-isolation circuit prevents power from the motor-alternator circuit from entering the oscillator and relay control circuitry. In an improved embodiment, a low-voltage detection circuit is used to sense a reduction in battery voltage, thus indicating an impending low battery voltage condition. Advantageously, a ground fault interruption device may be incorporated in the present invention without difficulty for enhanced personnel safety.

It is an object of the invention to limit power cable requirements to a single circuit using a conventional power cable, typically a two-conductor or grounded three-conductor extension cord, for power converters.

Another object of the invention is to enable remote activation of the motor-driven alternator over a single cable path which is also used to carry power to the appliance or tool.

Yet another object of the invention is to enable remote activation of the motor-driven alternator through closure of the on/off switch of solid-state appliances and tools, especially those requiring a relatively high trigger voltage.

Another object of the present invention is the inclusion in the voltage converter package of a low battery voltage warning circuit.

And still another object of the invention is the addition of a reliable ground fault interruption circuit in the converter to which the appliance or tool power circuit is connected, for personnel safety reasons.

A feature of one embodiment of the present invention is the incorporation of a relatively high-voltage ac (or pulsating dc) voltage for proper on/off control of the motor-driven alternator by solid-state switched appliances and tools.

Another feature of the invention is the incorporation of a low battery terminal voltage sensor and warning indicator.

A further feature of the invention is the incorporation of a ground fault interruption circuit to minimize electrocution hazards.

An advantage of the invention resides in the ability to use a solid-state switched appliance or tool connected to the power converter by an ordinary extension cord, and remotely control the motor-driven alternator by simply switching the appliance or tool on or off.

Another advantage of the present invention is a visual low battery terminal voltage indicator, to help prevent excessive discharging of the source battery.

Still another advantage of the invention is the inclusion of a standard ground fault interrupter for operating personnel safety.

With the foregoing and other objects, advantages, and features of the invention which will become hereinafter apparent, the nature of the invention may be more clearly understood by reference to the following detailed description of the invention, the appended claims, and to the several views illustrated in the attached drawings.

DETAILED DESCRIPTION OF THE PREFERRED EMBODIMENTS

Figure 1:
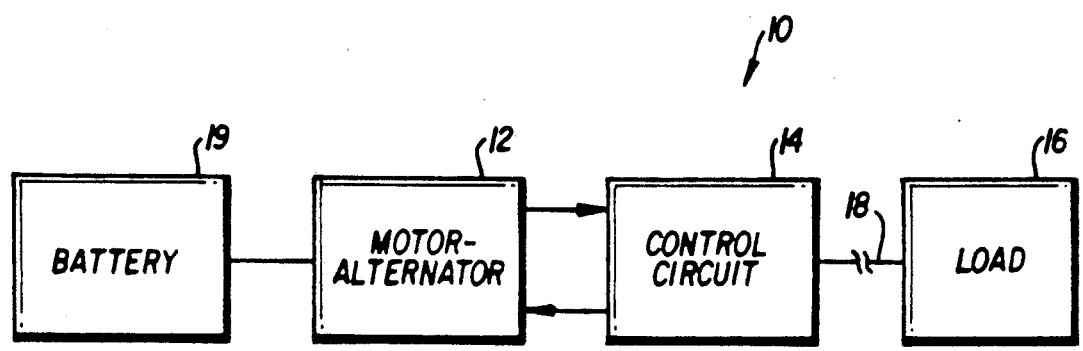
FIG. 1 is a simplified block diagram of an exemplary embodiment of the present invention.

There is shown in FIG. 1 a simplified block diagram of the invention designated generally by reference numeral 10, including a motor-alternator set 12, a control circuit 14, an appliance, tool, or load device 16, and a battery 19. A cable 18, which may be a conventional two-conductor or grounded three-conductor cable, is used to connect the appliance or tool to the remotely switched converter. Battery 19 is used to supply power to the motor of the motor-alternator set 12, which in turn drives the alternator of the set. The control circuit 14, interposed between the alternator and the load 16, detects closure of the power switch (not shown) of the load device. Upon sensing the closure of the switch, which may be a solid-state switch presenting a high impedance to the control circuit, a relay is closed in the control circuit 16 to electronically connect the battery to the motor, thus driving the motor-alternator set 12 and generating ac power for the load on cable 18.

Figure 2:
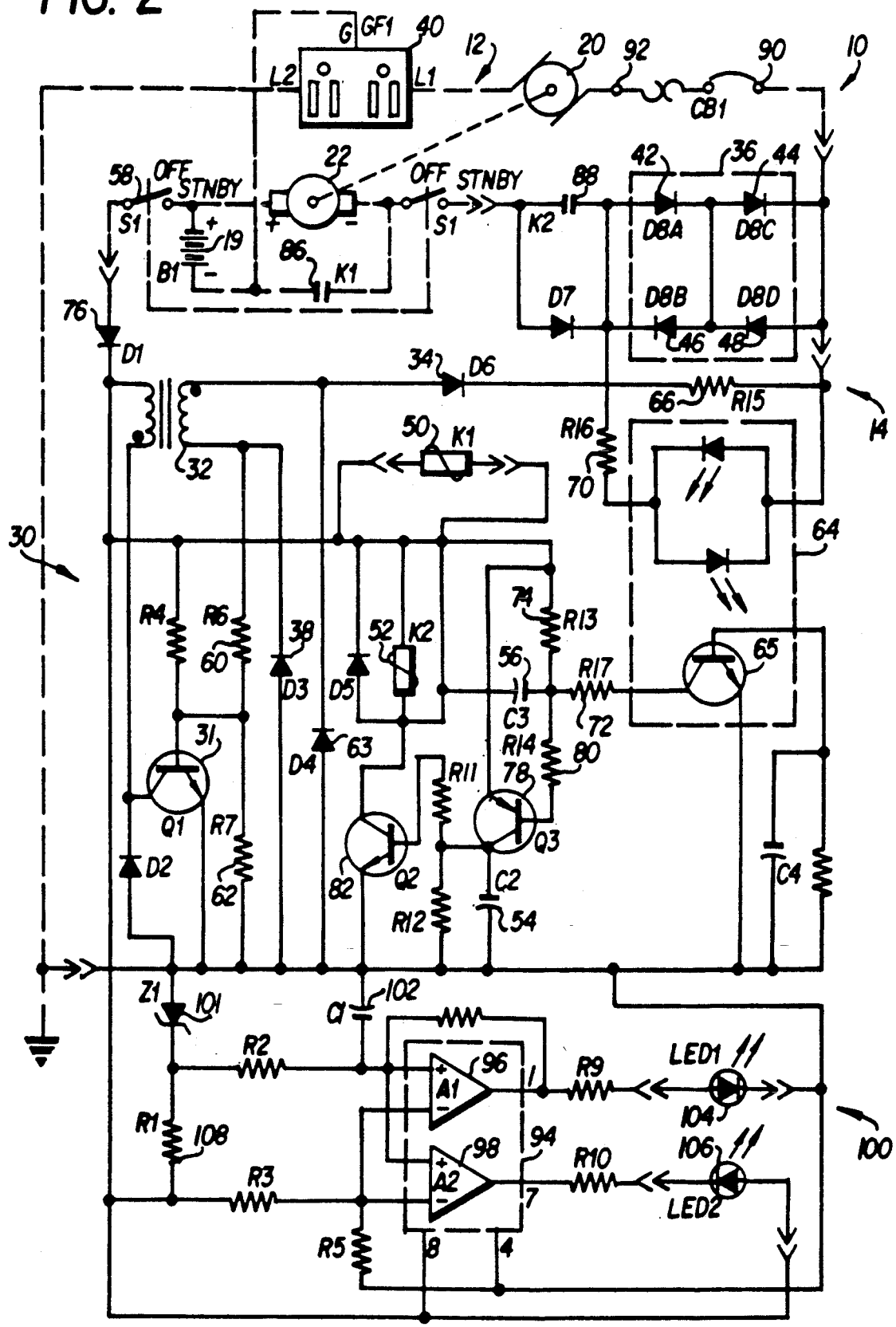
FIG. 2 is a schematic diagram of an exemplary embodiment of a remotely switched converter and control circuit, incorporating the primary features of the present invention.

A more complete and detailed illustration of the remotely switched voltage converter system 10 according to the present invention is shown in the schematic diagram of FIG. 2. The motor-alternator set 12 includes an alternator 20 mechanically driven by a dc motor 22 selectively powered by a battery 19. The load 16 (FIG. 1) is connected to the control circuit 14 by cable 18 (FIG. 1). In the FIG. 2 embodiment, the cable 18 is connected to the control circuit 14 and motor-alternator set 12 via a ground fault interrupter 40. A transformer coupled oscillator 30 comprising transistor 31, transformer 32, and associated circuitry, generates a comparatively high voltage (compared with the voltage of battery 19). That voltage is a high impedance sensing signal. A peak voltage of about 100 volts has been found generally suitable. Other voltage levels may be used, including peak-to-peak levels as low as 30 volts in some instances. This sensing voltage is supplied to the load device 16 (FIG. 1) via diode 34, bridge circuit 36, diode 38, alternator 20, ground fault interrupter 40, and cable 18 (FIG. 1).

When the load device 16 is switched on, the relatively high sensing voltage is sufficient to cause the solid-state control switch of the load device to switch to its conductive state. That is, the sensing signal voltage is sufficient to overcome the forward breakdown voltage of the solid-state device used in the switch. It is important to note that bridge 36 provides no rectification in this circuit configuration. It is used as a current sensor, providing an output voltage which is essentially independent of the magnitude of the current flowing. That is, a voltage of about 1.5 volts is derived from the voltage drop across the two diodes, even at low current flow rates. Connected in inverse parallel configuration, the diodes 42-48 of bridge 36 sense the ac load device current on each half-cycle of the sensing signal.

Typically, the solid-state devices used in the control switch for the load device incorporate three-terminal, four-layer semiconductor devices, such as thyristors or silicon-controlled rectifiers (SCR's); however, the present invention is believed suited to a broad range of current and future solid-state switch control devices as are or may become available.

The oscillator 30 supplies only an insignificant amount of power to the load device 16; its primary function is to provide a sufficient voltage level to which the solid-state control switch in the load device can respond. The duration (one half-wave of the oscillator sense signal) of the resulting current flow of battery 19 is sufficient to actuate relays 50 and 52. At least one additional delay function may prove useful in maintaining the relays in their energized state until the motor-driven alternator 20 exceeds a minimum output voltage. In the illustrated embodiment, the delay function is provided by capacitors 54 and 56. Once this minimum output voltage level is reached, the relays 50, 52 remain closed until the load device 16 switch is opened, provided the battery 19 is sufficiently charged.

In operation, closing switch 58 energizes the converter 10 in the STANDBY mode, ready to be remotely switched on by the tool or appliance. Transistor 31 and transformer 32 of oscillator 30 begin oscillating. These oscillations are sustained by positive feedback via a voltage divider comprising resistors 60 and 62 and diode 63; the voltage divider forward biases diode 38 to initiate the oscillations when switch 58 is initially closed. Diode 34 carries one-half of the peak-to-peak sensing signal waveform generated thereby to an opto-isolator 64, bridge 36, resistor 66, and diode 63. Note that diode 68 isolates the oscillator circuit from the low impedance battery circuit. Although the ground fault interrupter 40 is provided in the present embodiment and is preferred for personnel safety reasons, it may be omitted where both safety and regulatory circumstances permit. In the embodiment shown, the load device 16 is plugged into ground fault interrupter 40, and when the switch on the load device is closed, a voltage drop across the diodes 46 and 48 of bridge 36 results. This voltage drop is essentially independent of the current flow rate and results in a current division among the bridge 36, resistor 66, and the opto-isolator 64. Current-limiting resistor 70 and resistor 66, which acts as a shunt, serve to limit current flow to opto-isolator 64 to safe levels.

Opto-isolator 64, when so energized, presents a low impedance collector-emitter ground path to resistor 72 and through resistor 74 to the battery 19 via diode 76 and switch 58. Thus, resistors 72, 74 form a voltage divider forward biasing transistor 78 through current limiting resistor 80. Transistor 78 collector current then forward biases transistor 82, which in turn energizes relays 50, 52. Capacitor 54 delays turning on transistor 82 during its charge time, thus providing a brief time delay in energizing the relays to eliminate relay chatter. Other known delay techniques may be used to achieve equivalent results.

Relay 50 connects the drive motor 22 for alternator 20 to the battery 19 via contacts 86, energizing the motor 22 and initiating an output from alternator 20. Relay 52 closes contacts 88, shorting diode 68 and permitting the ac output current from alternator 20 to flow through bridge 36, a fuse 90 and/or circuit breaker 92 to the load device 16 via ground fault interrupter 40. The voltage drop which results across the inverse parallel diodes 42-46 of bridge 36 maintain opto-isolator 64 in an energized state; holding the relays 50, 52 closed.

So long as the on/off switch of the load device 16 remains closed or essentially closed without having been opened in the interim, the alternator 20 continues to provide ac power to the load device 16. Interruption of the load device current drain, however, results in cessation of current flow through the bridge 36 and opto-isolator 64 turns off, eliminating the source of forward bias for transistor 78. As collector current via the output transistor 65 of opto-isolator 64 diminishes, capacitor 56 begins charging through resistor 74, holding transistor 82 forward biased for a slight delay equal essentially to the charge time for capacitor 56, thus delaying the ultimate disconnection of battery power to the alternator drive motor 22. Due to the size of capacitor 54, additional turn-off delay time is obtained. Other known delay techniques may be used to achieve equivalent results. This delay feature is particularly useful in repetitive tool operations.

The embodiment illustrated in FIG. 2 also includes a battery charge state indicator circuit 100, generally comprising a dual operational amplifier 94 including amplifiers 96 and 98, Zener diode 101, capacitor 102, a pair of light-emitting diodes (LED's) 104 and 106, and associated circuitry. Resistor 108 and Zener diode 101 form a voltage divider circuit providing a reference voltage (determined by the Zener diode breakover voltage) to each of the two amplifiers 96, 98. The present circuit employs a 3.9 volt Zener diode; other battery voltages may require other Zener diode breakover voltage ratings. Selection of such other diodes is believed within the skill of the ordinary artisan in the field of electronics. Amplifier 98 drives LED 106, which is continually illuminated so long as the terminal voltage of battery 19 is adequate. For the present exemplary embodiment, LED 106 is of a green color. When the battery terminal voltage drops below the predetermined, Zener diode based-value selected as representative of its discharge state, amplifier 96 turns on and LED 104 becomes illuminated. For the present exemplary embodiment, LED 104 is of a red color. LEDs having other colors may be substituted for LED 104 and LED 106.

Amplifier 98 is connected to provide a current source for amplifier 96. Thus, the battery charge display circuit displays a green indicator so long as the power is on and the applied battery terminal voltage is present and adequate; the red LED indicator 104 switches on when the battery terminal voltage drops below the predetermined voltage and the green LED indicator 106 is turned off. The circuit is arranged such that when the red indicator becomes energized, it remains energized so long as sufficient battery terminal voltage is present to keep it energized.

The amplifiers 96, 98 of this example are enclosed in a common package 94 and may be a type 2904 op-amp package or its equivalent.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A voltage converter including an on-off control sensor for use with a switched load device, comprising:
   an alternator means for generating an ac voltage;
   motor means for driving the alternator means;
   an electrical power source for operating said motor means;
   means for supplying the ac voltage to the switched load device;
   an ac sensing voltage source;
   means for selectively passing at least a portion of the sensing voltage via said voltage suppying means to said switched load device;
   means for detecting a load on said sensing voltage source;
   means, responsive to said detecting means, for connecting the electrical power source to said motor means.

2. The converter of claim 1, wherein said ac sensing voltage source is an oscillator.

3. The converter of claim 1, wherein said detecting means includes two series connected diodes.

4. The converter of claim 3, wherein said two series connected diodes comprise two arms of a diode bridge.

5. The converter of claim 1, wherein said detecting means includes an opto-isolator.

6. The converter of claim 1, wherein said load device includes an on/off switch comprising a solid-state switch.

7. The converter of claim 1, wherein said connecting means includes means for disconnecting the electrical power source from said motor means, and further including means for delaying disconnection of the electrical power source from said motor means.

8. The converter of claim 1, further including means for delaying initial supply of ac voltage to said load device.

9. The converter of claim wherein said electrical power source is a battery, further including means for detecting a condition of low battery terminal voltage.

10. A voltage converter, comprising:
    an alternator;
    a motor for driving said alternator;
    a power source for said motor;
    a switched load device adapted to be connected to said alternator, said switched load device having a solid state switch; and
    means for sensing closure of said solid-state switch, comprising:
    a. a low current source of ac sensing voltage;
    b. means for passing at least a portion of said sensing voltage to said load device;
    c. means for detecting a current drain on said sensing voltage source; and
    means, responsive to said detecting means, for connecting said power source to said motor.

11. The converter of claim 10, wherein said detecting means comprises a diode bridge and an opto-isolator.

12. The converter of claim 10, wherein said low current source is a transformer coupled oscillator.

13. The converter of claim 10, wherein said connecting means includes means for disconnecting the power source from said motor and further including:
   first means for delaying disconnection of the power source from the motor; and
   second means for delaying connection of the power source to the motor.

14. A voltage converter for use with an ac load device having a solid-state on/off switch control characterized in the on condition by a high-impedance non-conducting state or a low-impedance conducting state when the applied voltage exceeds the forward breakdown voltage level of the solid-state switch, comprising:
   motor-alternator means for generating a high current ac voltage;
   a battery for powering the motor-alternator means;
   a low current ac voltage source;
   means for supplying the generated high current ac voltage to said ac load device via said solid-state switch;
   means for selectively passing at least a portion of the low current ac voltage via said supplying means to said ac load device;
   means for detecting a load on said low current ac source; and
   means, responsive to said load detecting means, for electrically connecting said motor-alternator means to said battery.

15. The converter of claim 14, wherein said solid-state switch is a three-terminal, four layer device having a forward breakdown voltage rating of 30 volts.

16. The converter of claim 14, wherein said solid-state switch is a three-terminal, four layer device having a forward breakdown voltage rating of between 30 and 100 volts.

17. The converter of claim 14, wherein said solid-state switch is a three-terminal, four layer device having a forward breakdown voltage rating of greater than 100 volts.

18. The converter of claim 14, further including a ground fault circuit interruptor interposed between the load device and the motor-alternator means.

19. The converter of claim 14, further including means for detecting battery terminal voltage comprising means for providing a reference voltage, and means responsive to the reference voltage for indicating the charge/discharge states of the battery.

20. The converter of claim 14, wherein said indicating means comprise visually distinguishable indicators.

* * * * *

UNITED STATES PATENT AND TRADEMARK OFFICE
CERTIFICATE OF CORRECTION

PATENT NO.   : 5,091,688
DATED        : February 25, 1992
INVENTOR(S)  : Dennis G. Ewald, et al It is certified that error appears in the above-indentified patent and that said Letters Patent is hereby corrected as shown below:

Column 6, line 46, "of claim" should be --of claim 1,--.

Signed and Sealed this

Eighth Day of June, 1993

Attest:

MICHAEL K. KIRK

Attesting Officer   Acting Commissioner of Patents and Trademarks